US008638471B2

(12) United States Patent
Wade et al.

(10) Patent No.: US 8,638,471 B2
(45) Date of Patent: Jan. 28, 2014

(54) SYSTEM AND METHOD FOR GENERATING RANDOMLY REMIXED IMAGES

(75) Inventors: Kevin Y. Wade, Madison, WI (US); Dana M. Lytle, Madison, WI (US); Benjamin T. Hirby, Madison, WI (US)

(73) Assignee: NONSEK LLC, Madison, WI (US)

( * ) Notice: Subject to any disclaimer, the term of this patent is extended or adjusted under 35 U.S.C. 154(b) by 802 days.

(21) Appl. No.: 12/730,577

(22) Filed: Mar. 24, 2010

(65) Prior Publication Data

US 2010/0245868 A1 Sep. 30, 2010

Related U.S. Application Data

(60) Provisional application No. 61/162,812, filed on Mar. 24, 2009.

(51) Int. Cl.
| | |
|---|---|
| *G06F 15/00* | (2006.01) |
| *G06K 1/00* | (2006.01) |
| *H04N 1/60* | (2006.01) |
| *H04N 1/46* | (2006.01) |

(52) U.S. Cl.
USPC ............................................. 358/1.9; 358/540

(58) Field of Classification Search
None
See application file for complete search history.

(56) References Cited

U.S. PATENT DOCUMENTS

| 6,259,457 B1* | 7/2001 | Davies et al. ................. 345/629 |
| 7,081,966 B2* | 7/2006 | Farago ......................... 358/1.15 |
| 2006/0039733 A1* | 2/2006 | Meyerhofer ................... 400/62 |
| 2007/0019261 A1* | 1/2007 | Chu .............................. 358/540 |

* cited by examiner

*Primary Examiner* — Douglas Tran
(74) *Attorney, Agent, or Firm* — Michael Best & Friedrich LLP

(57) ABSTRACT

A system and method for generating randomized remixed graphical images is provided. A database comprising a plurality of files representing graphic images is linked to a processor and computer executable instructions. Multiple image files are randomly obtained and randomly merged to form a new and unique merged image. The merged image can be manipulated and can be transferred to a substrate.

20 Claims, 8 Drawing Sheets

SYSTEM AND METHOD FOR GENERATING RANDOMLY REMIXED IMAGES

CROSS-REFERENCE TO RELATED APPLICATIONS

This application claims priority benefit of U.S. Provisional Application No. 61/162,812, filed Mar. 24, 2009, which is incorporated herein by reference in its entirety.

FIELD OF THE INVENTION

The present invention relates to a systems and methods for generating graphical images. In particular, various embodiments of the present invention relate to generating randomly remixed graphical images.

BACKGROUND OF THE INVENTION

Artists often generate new and interesting designs and artistic creations, while existing designs and images can grow stagnant over time. These same artists struggle to keep their artistic work fresh and new. However, significant value lies not only in the current artwork but also within the older and often stagnant graphical assets. The same often holds true for companies that own portfolios of graphical and artistic assets, such as trademarks, pictures, and logos.

A new remix culture has emerged, which has created and perpetuated significant value through the mixing of often old or forgotten artifacts, along with the mixing of new graphic assets. The remix culture is present within the music industry, where often stagnant melodies and songs are combined with other musical compilations, whether they are old or new. The combination and resulting remix often generates consumer interest resulting in new music sales. The use of old musical assets when remixed creates a newfound value for the owner of those assets.

SUMMARY OF THE INVENTION

Briefly, in one aspect the invention is a system for generating randomized images having a database structure for storing files representing graphical images and a computer processor configured to execute computer readable instructions. The system includes a randomizer for randomly selecting two or more images from the database and merging the two or more images to form a merged image and a printing apparatus configured to transfer the merged image from an electronic file to a selected substrate.

According to another embodiment, the invention is a method of transferring a merged image to a substrate including the steps of retrieving a first base image from an image database, retrieving a second base image from an image database, wherein retrieving the first and second base images is performed randomly. The method also includes generating a merged image by combining the first and second base images, selecting a substrate and dynamically selecting an associated method for transferring the merged image to the substrate.

In yet another embodiment, the invention is a printing system having a means for randomly obtaining and merging base images to form a merged image and a printing apparatus configured to transform the merged image from an electronic file format to a physical substrate surface.

Other aspects of the invention will become apparent by consideration of the detailed description and accompanying drawings.

DETAILED DESCRIPTION OF THE PREFERRED EMBODIMENT

Figure 1:
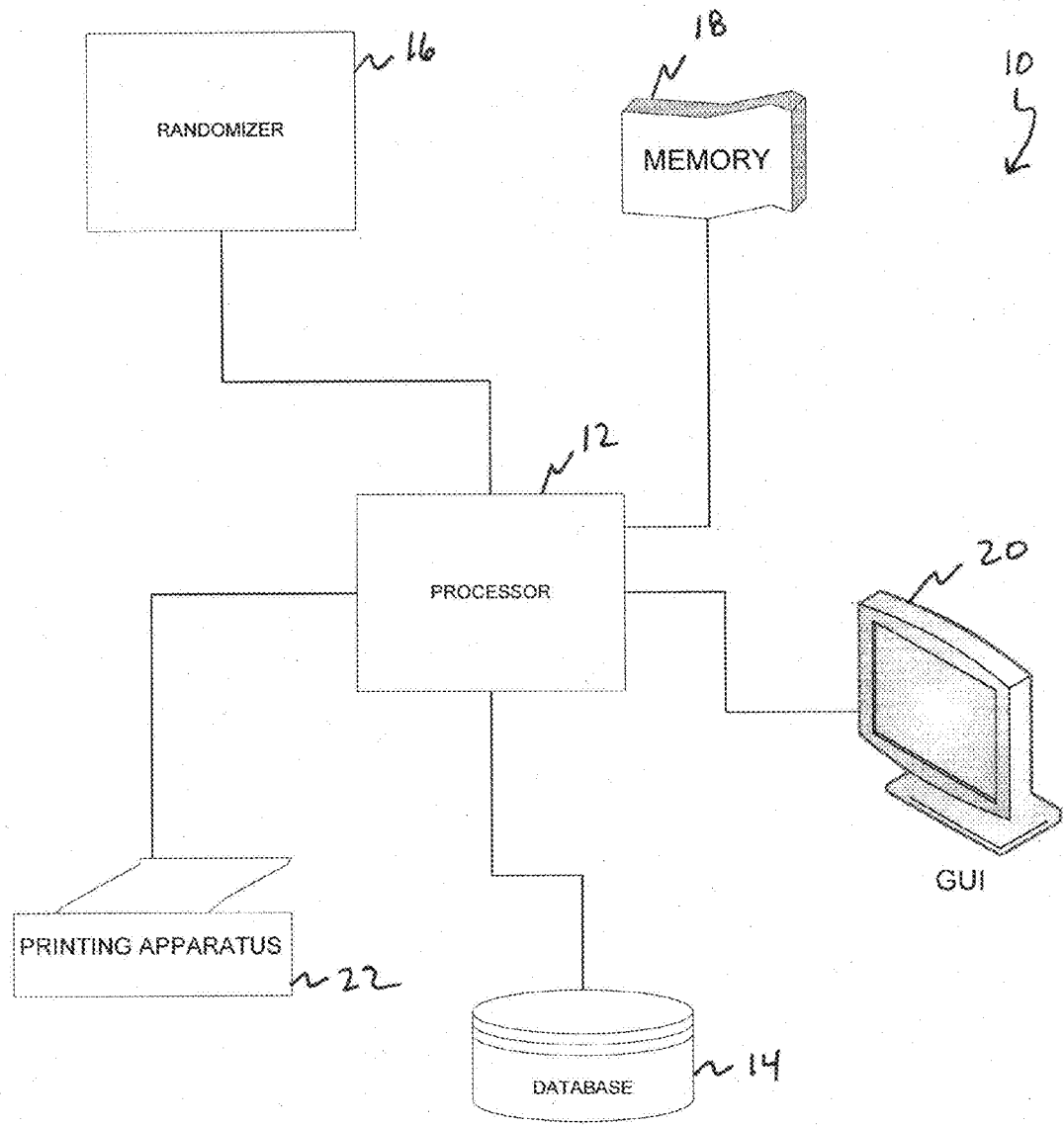
FIG. 1 is an exemplary block diagram of the system according to at least one embodiment of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other configurations are possible. Further, use of the term "processor" is meant to include systems architected in such a way as to have only a single processor or multiple distributed processors functioning serially or in parallel to perform the processing functions. In addition, in multi-processor systems, the description is meant to encompass constructions having all processors in one machine or in one location, or constructions having processors distributed across different machines or locations.

FIG. 1 illustrates an exemplary system 10 for generating randomized graphic images. The system 10 includes a computer processor 12, a database 14, an image randomizer 16, a memory storage module 18, a graphical user interface 20 and an image transfer apparatus 22, such as a printing apparatus. It is contemplated that the system can be accessed wirelessly, or alternatively be implemented on a wireless device (not shown).

The processor 12 is a computer hardware device that is capable of executing programmable instructions. It is contemplated that the processor is remotely connected to the database 14. According to at least one embodiment the randomizer 16 is logically contained within the processor 14, and alternatively the randomizer 16 is a stand alone processor or collection of processors.

The database 14 is a structured set of information related to graphic image assets, including the assets themselves. In at least one embodiment, the data base 14 is a relational database. However, memory modules and various associated data structures and other data management schemes are also contemplated. Stored within the database 14 are base image files representative of art, design, trademarks, pictures, video frames, print, animated characters, media, and other graphic or multimedia assets. Base images can further include referential icons, logos, illustrative characters, cartoons, symbols and glyphs. It is further contemplated that images include photos contained within a physical or electronic photo album. Photo album assets can be stored within a online database, memory storage device or housed online, such as in a Facebook user account or another online social/professional networking platform. Base images can be categorized in a plurality of ways, and cataloged within libraries stored on the database 14.

The image randomizer 16 generates a set of at least two base images that are combined, or remixed, to form a new merged image (See FIGS. 5-8). Each base image in the set of base images is randomly pulled from the database 14. In at least one embodiment, the randomizer 16 is a set of computer executable instructions configured to randomly select files within the database 14 based upon rules associated with the images and form a set of base images that are combined based upon default merge settings. Subsequent to the merge process, which includes image transformation, an executed script can display the randomly generated transformed image and store it in a new file format. The image can then be displayed for purchase, storage, creation outside an electronic environment or sharing for later reference. The transformed image can be converted into multiple file formats, which can facilitate viewing, purchasing, sharing or printing the transformed image.

Alternatively, the system 10 can be contained as a computer executable residing upon a mobile device (not shown), such as a smartphone, iPhone, iPad, cell phone laptop, or other mobile electronic devices. An exemplary embodiment can include an iPhone application. An internet connection or telephone network connection (3G or 4G, for example) could also be provided for accessing the database 14, randomizer 16 and/or printing apparatus, which can be remotely positioned with respect to the mobile device.

The printing apparatus 22 is a machine or set of machines configured to transfer and print images on articles of clothing, such as shirts, hats, and accessories, hard goods such as ceramics, metal, plastic, and paper goods such as stationary, posters, cards and stickers. An exemplary apparatus includes a screen printing device, an ink jet printing device or heat transfer device used for transferring pigment and/or a pigment-printed transfer image to various substrates based upon parameters set by the merged image. Alternatively, the printing apparatus 22 can be a selected from the group comprising a laser emboss system, a laser dye cut system, a heat transfer system and an etching system.

Base images and image frames containing the base images, can be logically associated with various image details, such as image placement. Specific base images can be coded for background, mid-ground, or foreground. Additionally, images can be assigned a positional slot oriented by a center point, or a Tic-Tac grid, on a substrate. It is further contemplated that a user can create a base image(s) for generating a unique merged image. A variety of file formats are suitable for database 14 storage, such as .rgb and .cmyk file formats. Additional file formats are contemplated and can be based upon the type of file, printing apparatus and substrate. Further, user's can partition specific types of base images, such that defined image types are not remixed. By example, a user could choose to keep fruit images and automotive images separated. Further by example, the works of a particular artist can be assembled within an image database. Fee-based access can be provided to the database, which allows consumers to remix that particular artist's works. Through remixing potentially stagnant assets, new assets and combining new and old assets, new images are generated and value is associated with the merged images and the original base images.

After the base images have been merged to create a new image, the printing apparatus 22 transfers the electronic file, which represents a new image, to a physical substrate. The substrate can be selected from a group comprising articles of clothing and accessories made of cotton, flannel, canvas, and alternative materials. The substrate can also be selected from a group of materials including plastics, polymers, glass, plexi-glass, ceramic, cardboard, rubber, paper, fiber, metal, leather, vinyl and wood. Additionally, the substrate can be selected from the group comprising posters, wall paper, greeting cards, pajamas, wallpaper, bags/packs, dishware, carpet tiles, shower curtains, automotive products, drapes, bed liners, lamp shades, pillows and other suitable consumer goods.

Figure 2:
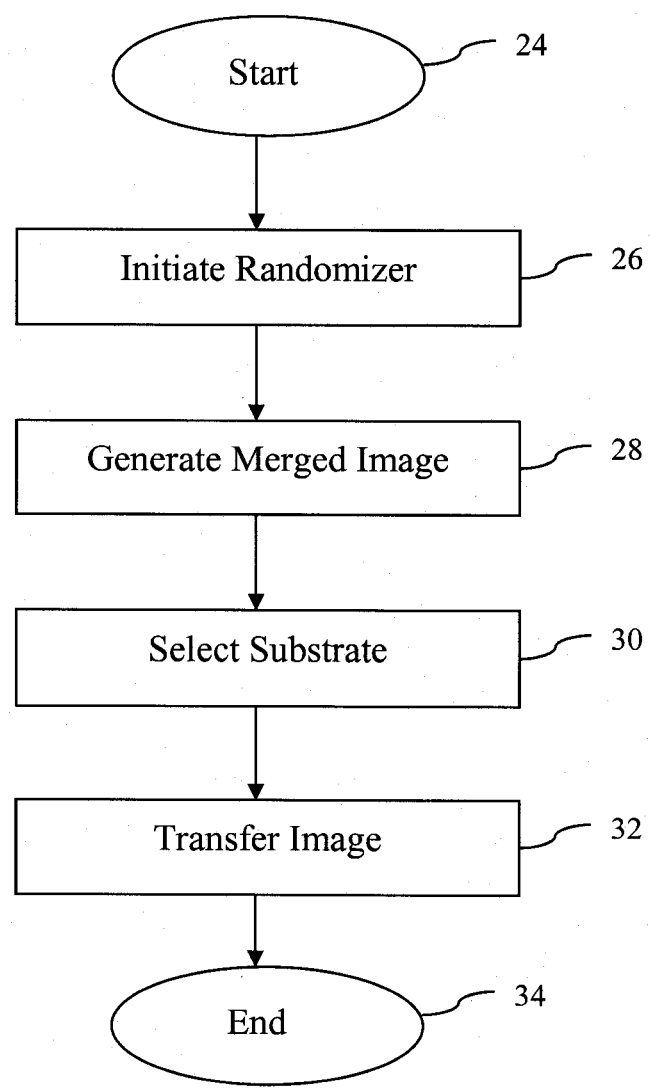
FIG. 2 is a flow chart representing exemplary process steps for merging randomly remixed images according to at least one embodiment of the present invention.

FIG. 2 illustrates a process for generating randomized remixed graphics. The process begins at step 24 and the randomizer is initiated at step 26. Once the base images are randomly obtained from the database they are merged at step 28. It is contemplated that two or more images are randomly obtained and merged together. The number of merged images can be between 3 and 5. Alternatively, it is contemplated that greater than 5 images can be merged. Once the merged image has been created, a substrate is selected at step 30. The merged image is transferred from a computer readable file to the substrate at step 32 and the process ends at step 34. Alternatively, a different substrate can be selected or the entire process is repeated at step 24.

Figure 3:
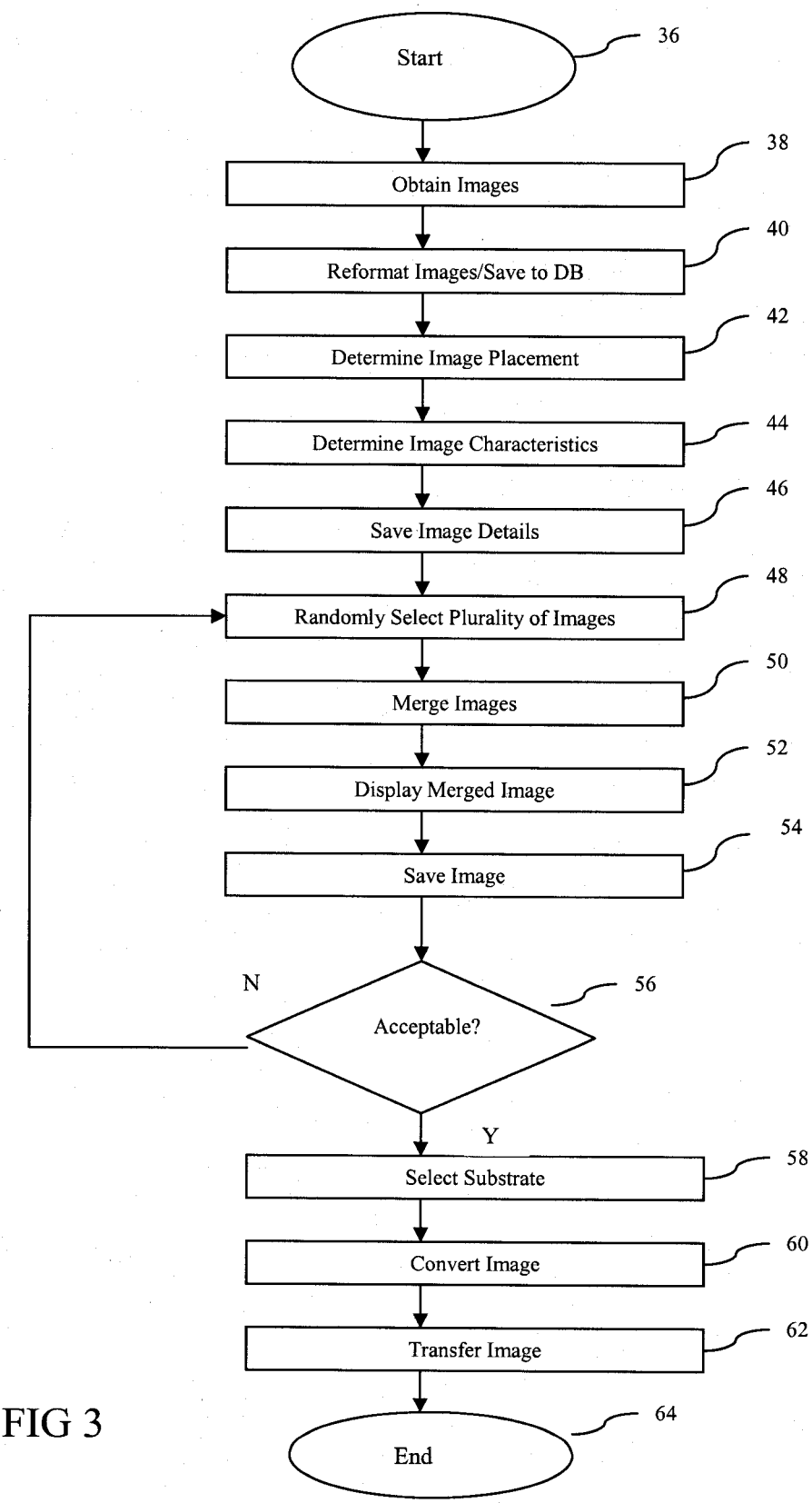
FIG. 3 is a flow chart representing another exemplary process for generating randomized remixed images and transferring a merged image to a substrate according to at least one embodiment of the present invention.

FIG. 3 illustrates another exemplary process for generating randomly merged images. The process is initiated at step 36 and a plurality of images are obtained at step 38. These images can be obtained from a plurality of sources. Depending upon the source, the images are reformatted and saved to the database at step 40. Placement details are determined for each image at step 42 and the image characteristics are determined at step 44. Image characteristics include, but are not limited, to color, size, transparency, orientation, and position with respect to other images. Characteristics of each image are stored within the memory module 18, or alternatively the database 14, at step 46. Two or more base images are randomly selected by the randomizer 16 at step 48 and the base images are merged at step 50. The step of merging images includes identifying each image's position with respect to the other images being merged, as well as other variables discussed herein. Once the merger is complete, the new merged image is displayed by the GUI 20 at step 52 and saved to memory 18 at step 54. Alternatively, the merged image can be temporarily saved within a cache memory (not shown). It is also contemplated that each merged image is saved within the database, such that when new merged images are generated, the new merged images are cross referenced against merged images that have already been created. A system administrator or alternative user can choose not to use a merged image that was previously generated, in order to have a truly unique image.

If the merged image is not satisfactory to the user at step 56, then step 48 is repeated. If the merged image is satisfactory, then a substrate is selected at step 58. Alternatively, additional merged images can be generated and graphically displayed together in order for a user to compare and contrast the various merged images, which can assist the user with selecting a final merged image to transfer to a substrate. The selected image file is converted to a suitable file format at step 60 for purposes of transferring the image to the substrate at step 62. An image transfer apparatus, such as a printer or screen printing "device, is used to transfer the electronic image to a physical substrate. The process terminates at step 64, or is alternatively repeated. Alternatively, the merged image is not transferred to a substrate, but resides as an electronic file that can be displayed in a plurality of settings. By example, merged images can be displayed on a variety of electronic media display devices, including electronic billboards, websites, digital photo frames, computing device interfaces and projected on to a surface.

Figure 4:
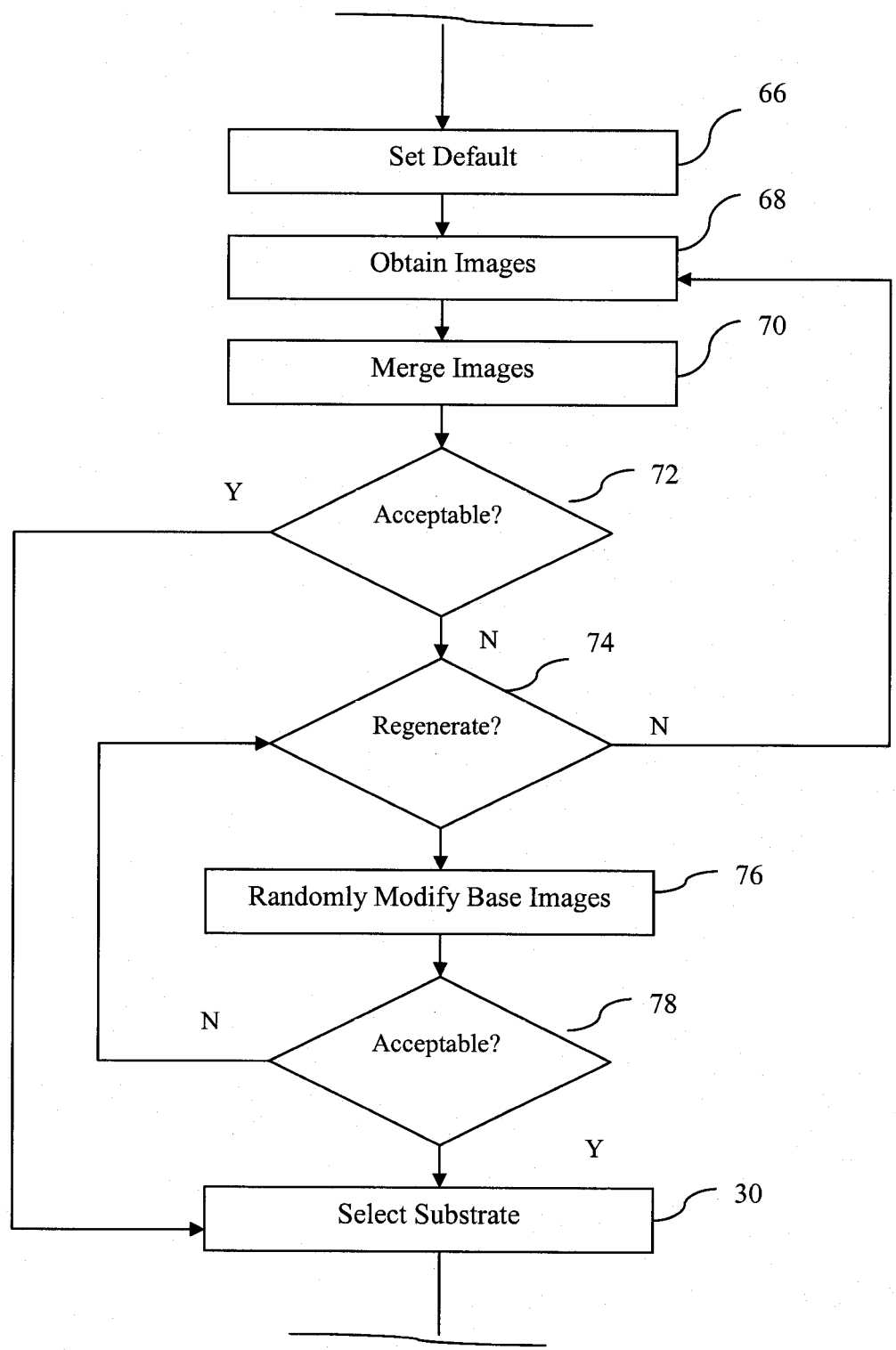
FIG. 4 is a flow chart representing another exemplary process for generating randomized images according to at least one embodiment of the present invention.

FIG. 4 illustrates an alternative process for generating randomized images is provided. The image preferences and merging characteristic default setting is selected at step 66. A plurality of base images is randomly selected from the database 14 at step 68. The images are merged together based upon the default settings at step 70. If the merged image is acceptable to a user at step 72, then a substrate is selected at step 30. Alternatively, if the image is not accepted by a user, then a decision whether to use the same base images occurs at step 74. If the same base images are not used to generate a second merged image, then step 68 is repeated. However, if the same base images are used, then the image characteristics and positioning can be randomly generated by the randomizer at step 76, and the default settings are avoided. Where two or more merged images are generated utilizing the same base images, a system 10 user can choose to view the merged images together. If one of the merged images is acceptable to the user at step 78, then a substrate is selected at step 30. In another embodiment a user can select a plurality of image rules for guiding the random selection of images to be merged.

Alternatively, images and image frames can be logically "locked", thereby providing guided random remixing of images. As an example, a user can be provided with a plurality of image types, formats, categories, variables and image characterization options. A user can select one or more options that will provide sorting of potential merged images in a random order. Through layer locking a user can exhibit greater control over the final guided-remix. By example, selecting from a list of artist-specific images for purposes of generating a merged image represents a locked channel. The channel is identified as only image assets attributed to the selected artists. Locked channels for two or more different artists or categories can be combined and merged. Additional image selection and controls are contemplated.

Additional image variable controls are contemplated for enhanced user interaction. Variable controls can include, but not limited to, changing art image size, transparency, location, rotation, and color. By example, images can be changed to black/white, increased in size by 25%, rotated by 180% or increase transparency of the images. Category selections can be locked while other categories can remain random. By example, the foreground base image can be locked to a "fruit" or "historical figure" category, while the mid-ground and background images are randomly selected from all available categories. Additional variations on this same concept are contemplated. Furthermore, art/image placement can be coded/scripted, which increases the available options and randomness associated with the ultimate merged image. Art Image categories can be generated to add user selection control. It is further contemplated that a merged image having two or more image frames can be generated, and then an option provided to a user for removing one or more of the image layers to selectively customize the randomly generated merged image.

Images retrieved from the database represent a tangible object that has real value, particularly once they are displayed on a computer monitor or upon a physical substrate. By randomly selecting images and combining the selected images to create a new merged image, these tangible objects are transformed. The transformation and new image has significant artistic and fashion value. In another embodiment, a plurality of images includes a single image repeated with or without additional base images. Merging modified versions of the same base image can generate unique designs.

According to at least one embodiment, the system 10 is associated with a single company's image database and operated through the company's website. Customers and employees of the company can access the system 10 through a web interface and generate randomized and unique images based upon the company's image database. Customers can generate new images for products that they consume, and employees can create merged images for use as promotional, team building, or an alternative purpose, and have the images printed upon clothing or alternative substrates. Alternatively, a parent corporation can have a plurality of subsidiary companies, each having their own image database. Merged images can be created from these databases, thereby utilizing graphics and/or brands from a plurality of databases.

By example, a database can conservatively contain 200 images. A user can execute the randomizer 16 and select a merged image based upon 3 base images. Image characteristics, for example, can include three different sizes, four rotational positions, 9 placement positions, mirror vs. original, three alternative color combinations and foreground/background/midground selection. With these image characteristic options and 200 images there are about 134,784,000,000 unique merged images that are randomly available to a system user for purposes of transferring to a substrate. Additional image characteristics and variables are contemplated.

In another embodiment, a user can remix the merged image. This can be performed randomly or through user variable selection. The merged image was created by combining two or more randomly selected images. The randomly selected images were oriented in a default manner to create a new merged image. The default settings can be altered, thereby creating an added layer of randomization. Variables can include image position, such as foreground, mid-ground, and background, image size, color, level of transparency, and rotational and off-center positioning. In particular, the system 10 is advantageous due to the random nature of the randomizer output and the unlikely event that that particular image will be re-generated based on statistical likelihood. As variables are introduced to the randomizer 16 additional transformational attributes can occur in the process, which diminishes the likelihood that an image will be repeated. Therefore, more unique images can be generated thereby adding greater value to the business using various embodiments of the present invention.

Figure 5:
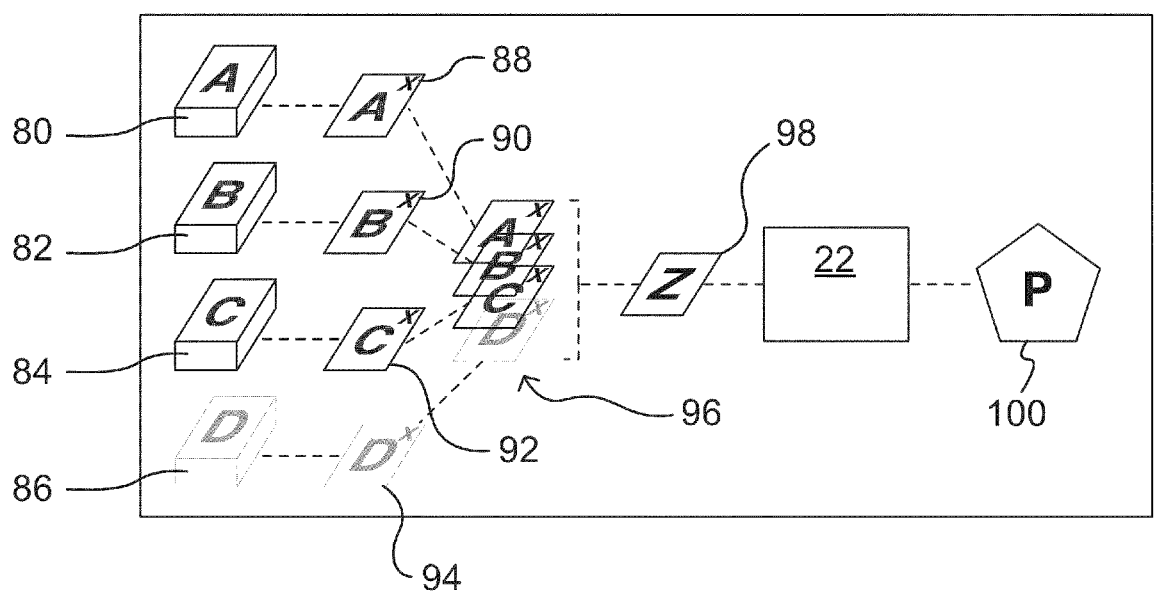
FIG. 5 is an exemplary graphical representation of a process for merging randomized images and transferring the merged image to a substrate in accordance with at least one embodiment of the present invention.

FIG. 5 illustrates an exemplary representation of merging four base images. Base images 80, 82, 84, 86 are converted to corresponding formatted base images 88, 90, 92, 94, which are superimposed upon one another from top to bottom in the sequence 88-90-92-94 and graphically depicted at 96. A single merged image 98 is generated and sent to the printing apparatus 22. The merged image 98 is transferred to a substrate 100, the combination of which represents a tangible product. Characterized another way, a plurality of images are transformed from separate and distinct objects to a new and unique image, which is then transferred to a tangible product substrate.

According to another exemplary process, three images are randomly selected and merged together. The first image is placed in the foreground, the second image is placed in the mid-ground, and the third image is placed in the background. The images are uniformly positioned with respect to a center point and layered on top of each other to create a merged image. The three images can be merged in a variety of alternative ways. By example, the first image can be placed in the background and the third image placed in the foreground, while altering the image placement with respect to a center point. This would create a similar, but completely new merged image. Each image can be independently altered based upon a plurality of variables as well as the orientation of each of the separate images with respect to the others, can be altered based upon a plurality of variables. It is contemplated that there are additional variables relating to image modification and placement which have not been enumerated herein, and that the invention is not limited to the variables identified herein.

Figure 6:
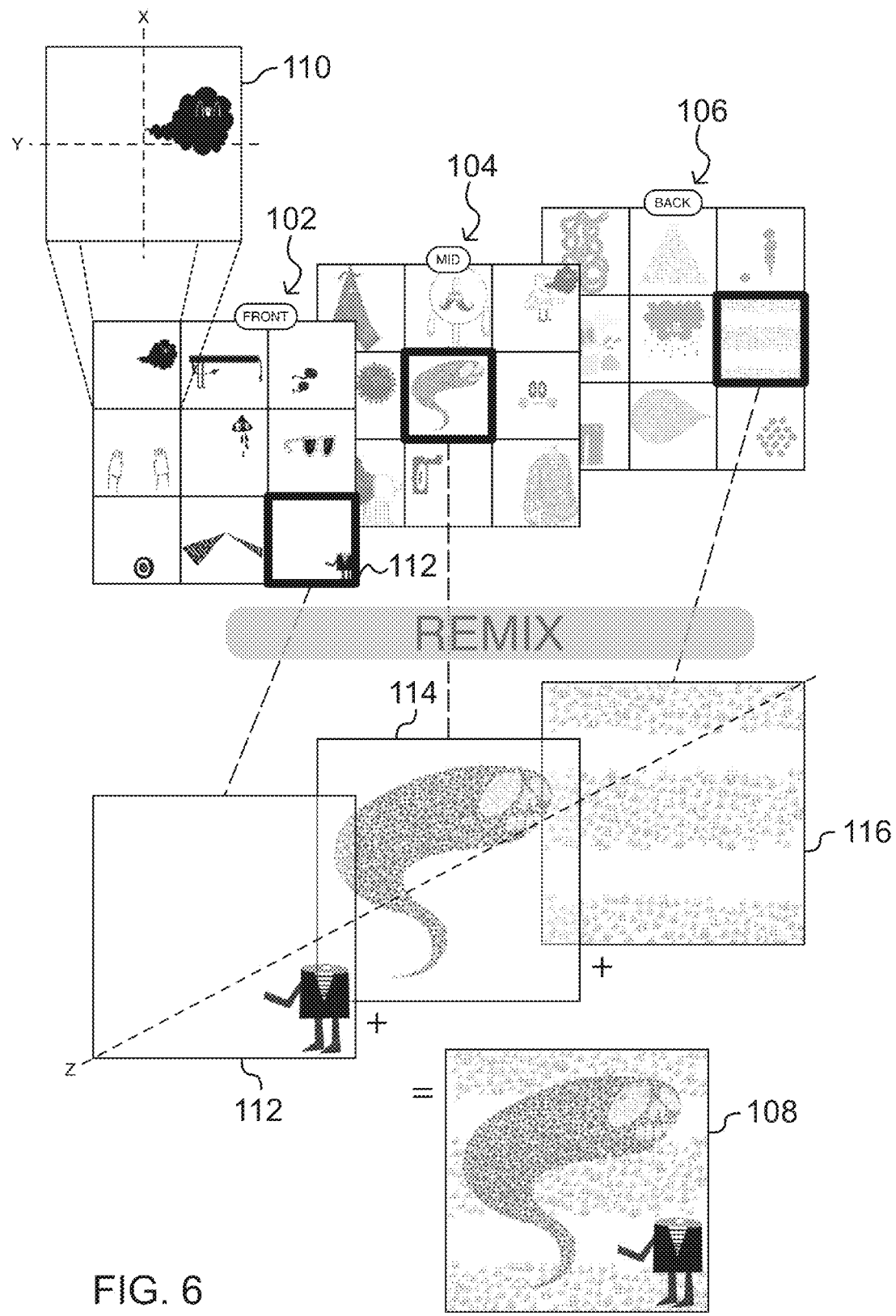
FIG. 6 is an exemplary graphical representation of a set of three randomly selected images combined to form a new merged image.

FIG. 6 illustrates an exemplary process for merging a plurality of graphic images. By example, a first image selection block 102 represents a front image, a second image selection block 104 represents a mid-ground image and a third image selection block 106 represents a background image. The front, mid-ground and background define the image placement with respect to the other when they are superimposed within a single merged image 108. Each of the image selection blocks 102, 104, 106 includes a grid comprising nine images that can be randomly selected as the respective foreground, mid-ground and background images. It is contemplated that less than nine or greater than about nine images can be represented within a particular image selection block 102, 104, 106. Additionally, the placement of an image within a particular image frame 110 can be randomly selected. By example, image frame 110 represents a graphic that is placed substantially within an upper right hand quadrant of frame 110, an x-axis and y-axis being shown for clarification purposes. Another exemplary image frame 112 includes an image placed substantially within a lower right hand quadrant of the frame 112, which is selected as the foreground image. The mid-ground image frame 114 is selected as well as the background image frame 116. The image frames 112, 114, 116 are provided within an exemplary exploded z-axis, which illustrates the images individually and then followed by the merged image 108. The merged image represents an entirely new image having the three respective image frames 112, 114, 116. The new image 108 represents a remixed image that can be transferred to a substrate or utilized as a unique graphic within digital files.

Figure 7:
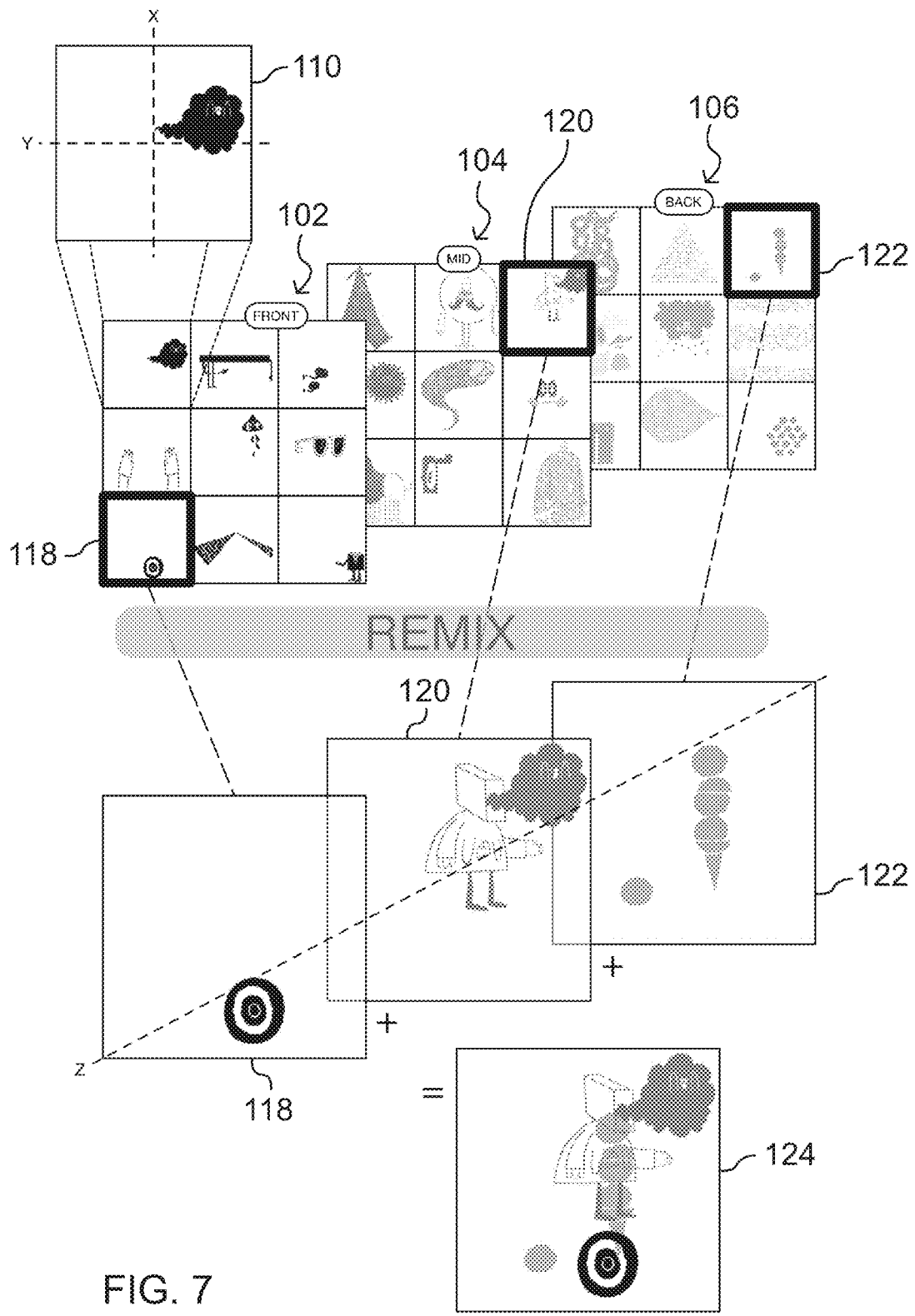
FIG. 7 is another exemplary graphical representation of a set of three randomly selected images combined to form a new merged image.

FIG. 7 illustrates another image merge process using the same image selection blocks 102, 104, 106 provided within FIG. 6. The present example utilizes foreground image frame 118, mid-ground image frame 120 and background image frame 122 to form new image 124. Each separate image frame 118, 120, 122 includes a unique image that has its own meaning and connotation, but when combined a new image 124 is created. The new image 124 represents a unique image based upon the x-axis, y-axis and z-axis location of the respective images 118, 120, 122.

Figure 8:
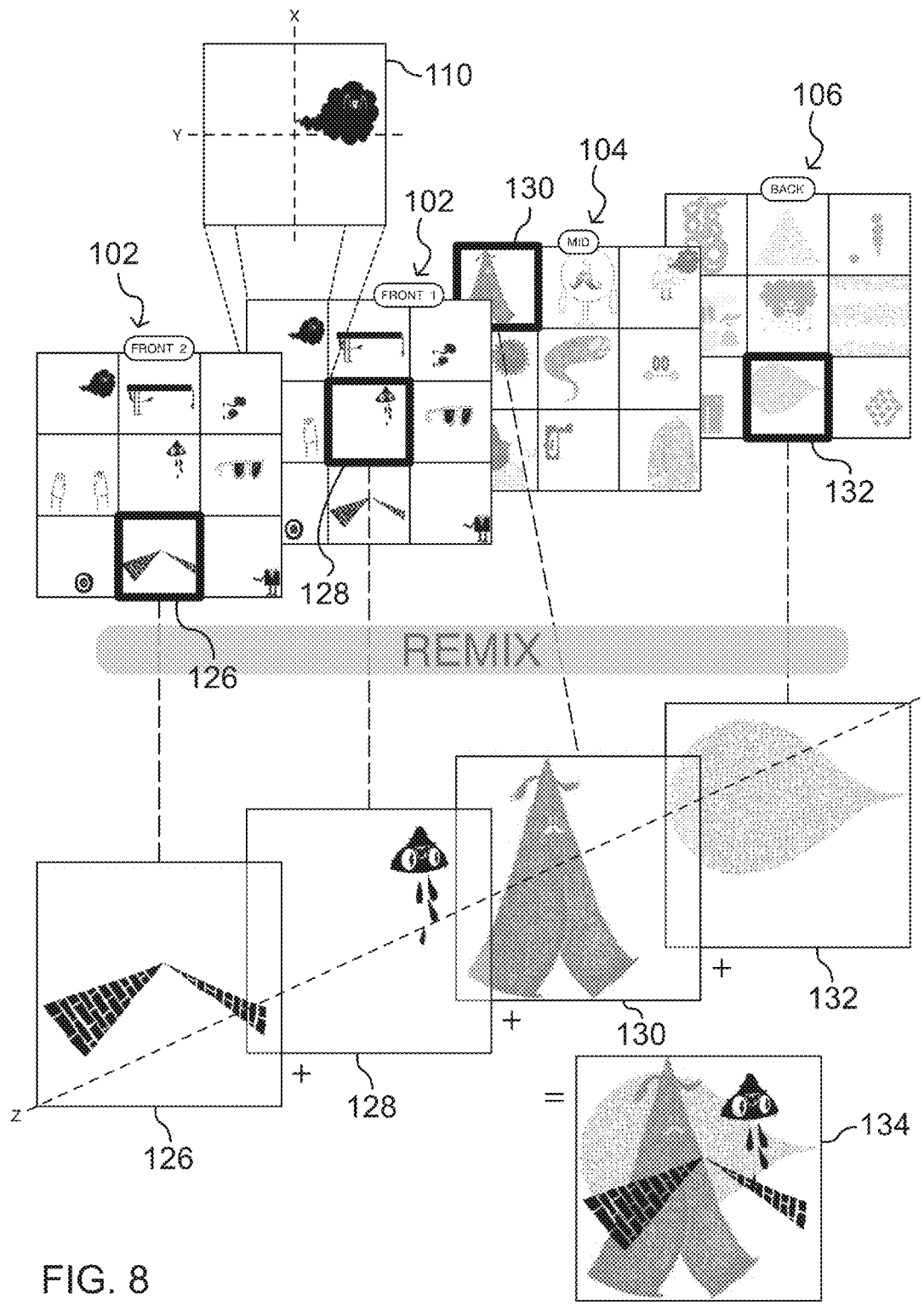
FIG. 8 is an exemplary graphical representation of a set of four randomly selected images combined to form a new merged image.

FIG. 8 illustrates another exemplary image merge process which includes four separate images. Image selection blocks 102, 104, 106 are provided, with image block 102 used for a first foreground and second foreground image selection. Image frames 126, 128, 130 and 132 are randomly selected to form a new merged image 134. It is contemplated that additional image selection blocks representing different images are selected for the first and second foreground, mid-ground and background images. It is further contemplated that more than four randomly selected images can be combined in order to form a new re-mixed image.

FIGS. 6-8 illustrate exemplary merged images based upon at least one embodiment of the present invention. There are three axis (X,Y,Z) that are utilized for purposes of randomly generating a merged image. The X and Y axis are utilized for purposes of image/frame position, size and color. The Z axis determines the image/frame layer and location with respect to other layers. The merged images represent a plurality of variables and a plurality of images that are combined to form a new image. According to at least one embodiment, the randomizer executes a script that calls for a random selection of images from two or more images files. The image files are selected from two or more layers and then combined to form an entirely new image.

In yet another embodiment, the randomizer 16 can be locked for purposes of guiding a process for merging graphic assets contained within an electronic photo album. By example, the photo album is electronically available and each of the assets/photos within the album are available for purposes of merging with other graphic assets. The other graphic assets can include photos, artwork or any additional graphic asset, which can include text. User controls can be provided to guide the user for purposes of combining photo assets with other graphic assets, which can include the type of photos and graphic assets, as well as the placement and orientation of the graphic assets. New merged/remixed graphic assets including photos can enhance a users Remixing various assets can generate a new base of reference, which can foster broader ideas, concepts, market value and monetized/cultural opportunities that otherwise would have remained unrealized in the absence of remixing. Randomly combining graphics, by example, of people, places, things, animals and/or food can carry an intrinsic meaning Remixing these images with other graphics, can yield weird and wonderfully whimsical results expressed creatively on a substrate, such as a t-shirt, paper goods, hard goods, clothing and accessories. Consumers place a significant value on creative designs in the fashion industry, such that a T-shirt, or alternative substrate, incorporating the design can sell in excess of $100. Even at a fraction of this amount, companies and artists can generate significant economic value through remixing existing graphical assets currently in use and or those no longer in commercial use. Various embodiments of the present system also allow a single artist, or graphic asset owner, an opportunity to expand a collection of unique, one of a kind artwork in numbers beyond what was possible before this invention, in an economical and ecologically sustainable method. Consumers will often pay a premium for fashion that is by definition, "one-of-a-kind" Companies benefit substantially as they re-cycle dormant, non-value generating graphical assets by remixing the assets for new value and meaning. Additionally, companies can realize a new revenue stream based on leveraging previously unused and/or underused graphical assets. Industry associates can also benefit from the image randomizer 16 as they seek out new and inventive imagery. This can act to satisfy the visual attributes needed to support the identities and creative ideas required by companies large and small in distinguishing themselves visually.

In less than a year's time frame, a web-based embodiment of the present invention has exhibited increasing commercial success. The commercial success includes more than about 30,000 visitors and more than about 100,000 webpage views. On average, consumers and visitors of the web-based embodiment (www.nonsek.com) spend about 33% more time engaged with the pages of the web-based embodiment verses Google's database measurements of similar websites. Furthermore, search engines have been increasing the page ranking for the web-based application, which is a direct indicator of importance within an industry. Products offered by the web-based application have been sold with increasing numbers within greater than about 5 countries, with consumers viewing the web-based application from greater than about 112 countries in less than a year. Furthermore, the sale conversion rate has been increasing and in cases exceeded 2.0% conversion of all users to consumers. Additionally, an increasing number of famous and critically acclaimed artists, illustrators, and graphic designers have sought to work with and use various embodiments of the present invention.

In another embodiment, the system 10 is a web based application accessible to consumers via the Internet. Consumers access a website, choose image characteristics and a unique image is generated. If the consumer likes the new design/merged image, they can select a substrate, such as a T-shirt. The image is printed on the T-shirt and shipped to the consumer in as little as 1 day.

In yet another embodiment, the merged images can be distributed, shared and sold though social networking sites. By example, a merged image can be sold/shared/purchased as a Facebook gift and distributed amongst 'friends' on their profile pages. Facebook users can then select the merged image for transferring it to a substrate, such as a T-shirt.

It is specifically intended that the present invention not be limited to the embodiments and illustrations contained herein, but rather that the present invention also include modified forms of those embodiments including portions of the embodiments and combinations of elements of different embodiments as come within the scope of the following claims.

We claim:

1. A system for generating randomized images, comprising:
    a database for storing files representing graphical images;
    a computer processor configured to execute computer readable instructions;
    a randomizer for randomly selecting two or more images from the database and merging the two or more images to form a merged image; and
    a printing apparatus configured to transfer the merged image from an electronic file to a substrate.

2. The system according to claim 1, wherein the database includes library files associated with a plurality of image categories.

3. The system according to claim 1, wherein the randomizer is a set of computer executable instructions configured to randomly select files representing graphical images within the database based upon rules associated with the images and form a set of base images.

4. The system according to claim 1, wherein the randomizer selects images from the database based on image characteristics prior to merging.

5. The system according to claim 4, wherein the image characteristics are selected from a group including image positioning, image size, image orientation, color, degree of transparency, and alternative image characteristic data.

6. The system according to claim 5, wherein the image positioning data is selected from the group comprising foreground, mid-ground, background, rotational and alternative positioning data.

7. A method of transferring a merged image to a substrate, comprising the steps of:
    retrieving a first base image from an image database;
    retrieving a second base image from an image database, wherein retrieving the first and second base images is performed randomly;
    generating a merged image by combining the first and second base images, wherein the merged image is a new and unique image based upon the first and second base images; and
    receiving a substrate selection from a user and dynamically selecting an associated method for printing the merged image onto the substrate.

8. The method according to claim 7, wherein the merged image is generated from three or more base images.

9. The method according to claim 7, wherein image positioning and image characteristic data is associated with each of the base images.

10. The method according to claim 9, wherein the merged image is dependent upon the randomly selected image positioning data and/or the image characteristic data.

11. The method according to claim 9, wherein the image positioning data is selected from the group comprising foreground, mid-ground, background, rotational and alternative positioning data.

12. The method according to claim 9, wherein the image characteristic data is selected from the group comprising image size, color, degree of transparency, and alternative image characteristic data.

13. The method according to claim 7, wherein the substrate is an article of clothing and the associated method of printing the merged image uses a screen printing apparatus.

14. The method according to claim 7, wherein the substrate is selected from the group comprising an article of clothing, a notebook, a credit card, a dish, a coffee mug, wrapping paper, photo paper, glass, and metal.

15. The method according to claim 8, further comprising locking image layers to provide a guided-randomized merged image.

16. A printing system, comprising:
    a computer processor configured to execute computer-readable instructions;
    a software program stored on a non-transitory computer readable medium accessible by the processor, wherein the software program includes instructions for
    randomly obtaining a plurality of base images from a database, and
    merging the plurality of base images to form a merged image; and
    a printing apparatus configured to transfer the merged image to a physical substrate surface.

17. The printing system according to claim 16, wherein the software program further includes instructions for randomly altering base image variables, wherein a plurality of unique images can be formed from a set of base images.

18. The printing system according to claim 17, wherein three or more images are merged to form a new and unique re-mixed image based upon the three or more images.

19. The printing system according to claim 18, wherein the three or more images are merged within a three-axis logical orientation.

20. The system according to claim 1, wherein the merged image is a new and unique image based upon a first, a second, and a third base image.

\* \* \* \* \*